No. 746,995. PATENTED DEC. 15, 1903.
A. W. ROBINSON.
FLOATING DISCHARGE PIPE FOR HYDRAULIC DREDGES AND MEANS FOR CONNECTING THE SAME TO DREDGES.
APPLICATION FILED APR. 4, 1903.
NO MODEL. 4 SHEETS—SHEET 2.

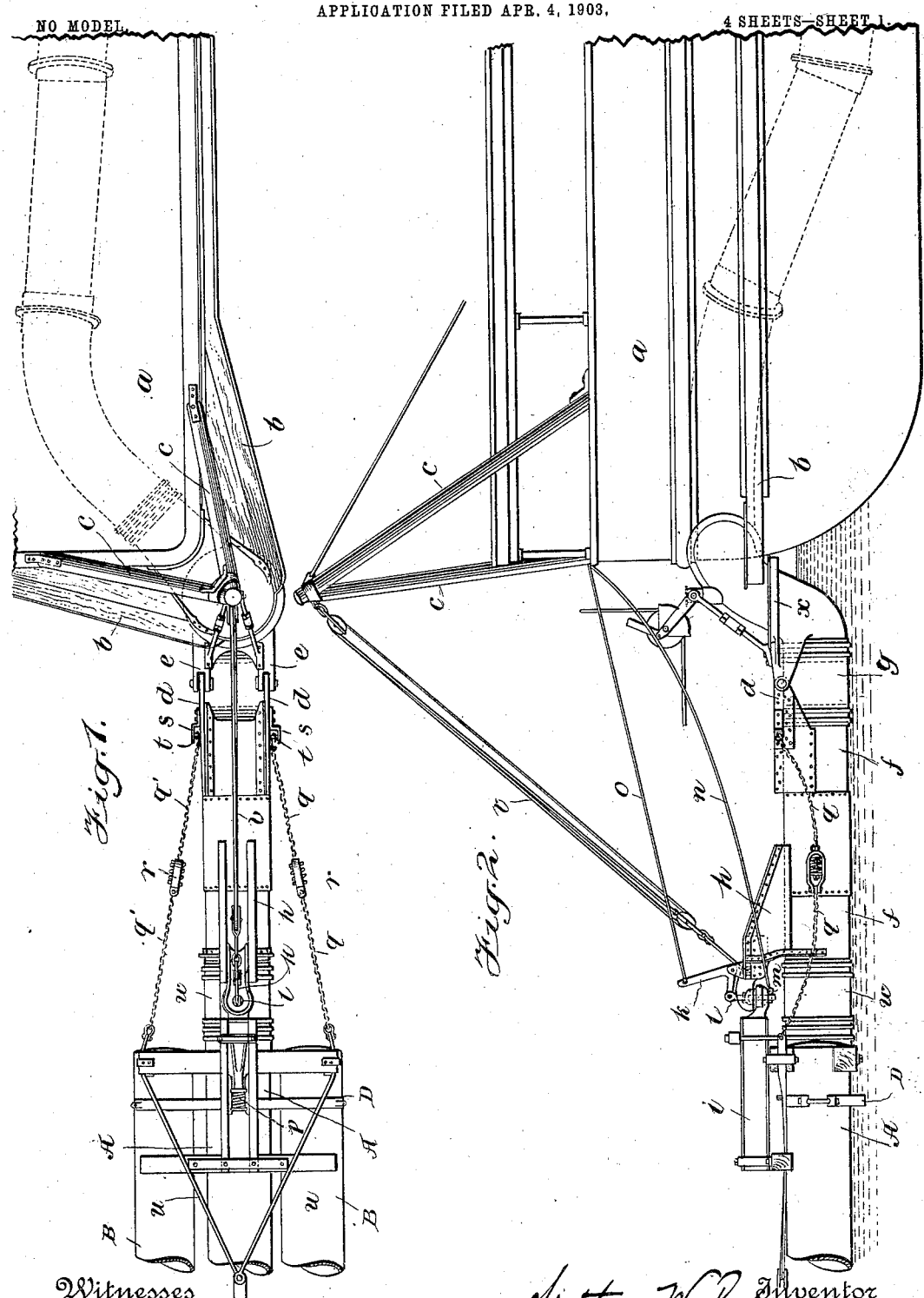

Witnesses
Inventor
Arthur W. Robinson
By his Attorney
Phillips Abbott

No. 746,995. PATENTED DEC. 15, 1903.
A. W. ROBINSON.
FLOATING DISCHARGE PIPE FOR HYDRAULIC DREDGES AND MEANS FOR
CONNECTING THE SAME TO DREDGES.
APPLICATION FILED APR. 4, 1903.
NO MODEL. 4 SHEETS—SHEET 3.
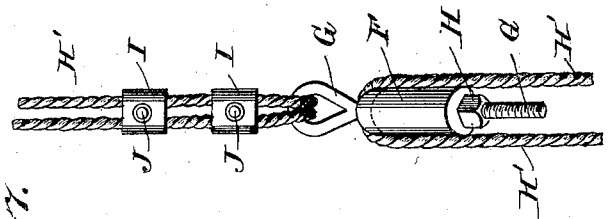
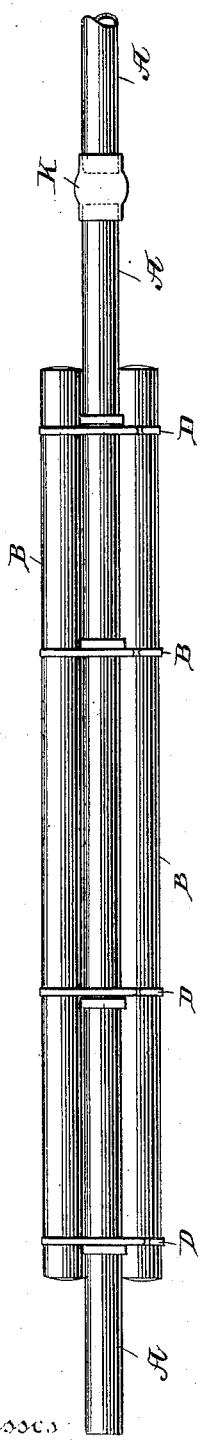
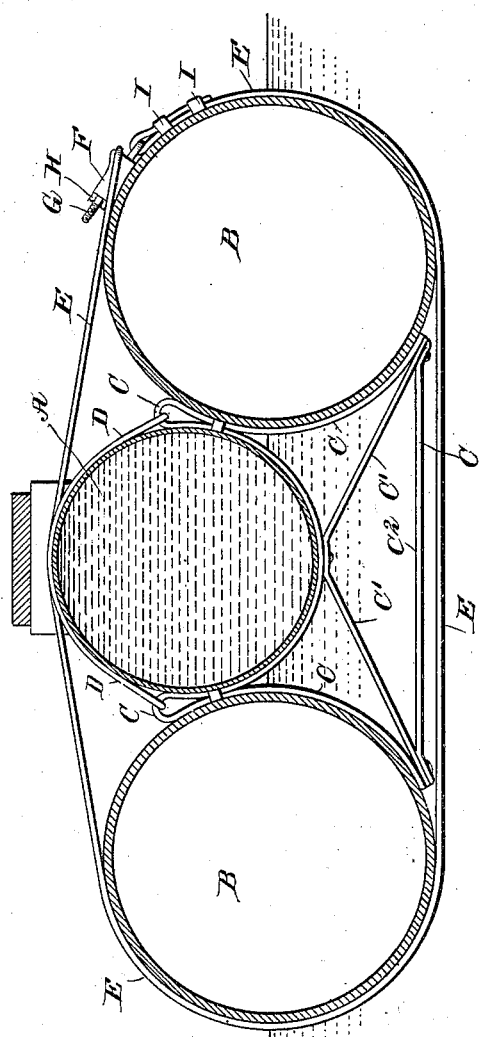

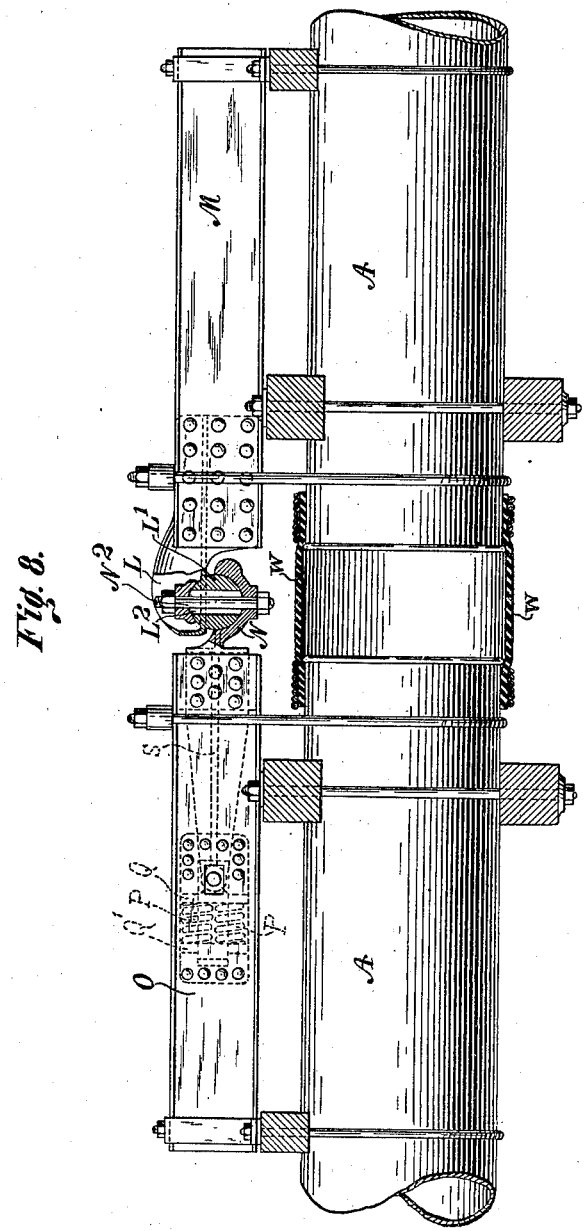

No. 746,995. Patented December 15, 1903.

UNITED STATES PATENT OFFICE.

ARTHUR W. ROBINSON, OF MONTREAL, CANADA.

FLOATING DISCHARGE-PIPE FOR HYDRAULIC DREDGES AND MEANS FOR CONNECTING SAME TO DREDGES.

SPECIFICATION forming part of Letters Patent No. 746,995, dated December 15, 1903.

Application filed April 4, 1903. Serial No. 151,030. (No model.)

*To all whom it may concern:*

Be it known that I, ARTHUR W. ROBINSON, a citizen of the Dominion of Canada, and a resident of the city of Montreal, Province of Quebec, Dominion of Canada, have invented new and useful Improvements in Floating Discharge-Pipes for Hydraulic Dredges and Means whereby Such Pipes May be Connected to the Dredges, of which the following is a full, clear, and exact specification, reference being had to the accompanying drawings, in which—

Figure 3:
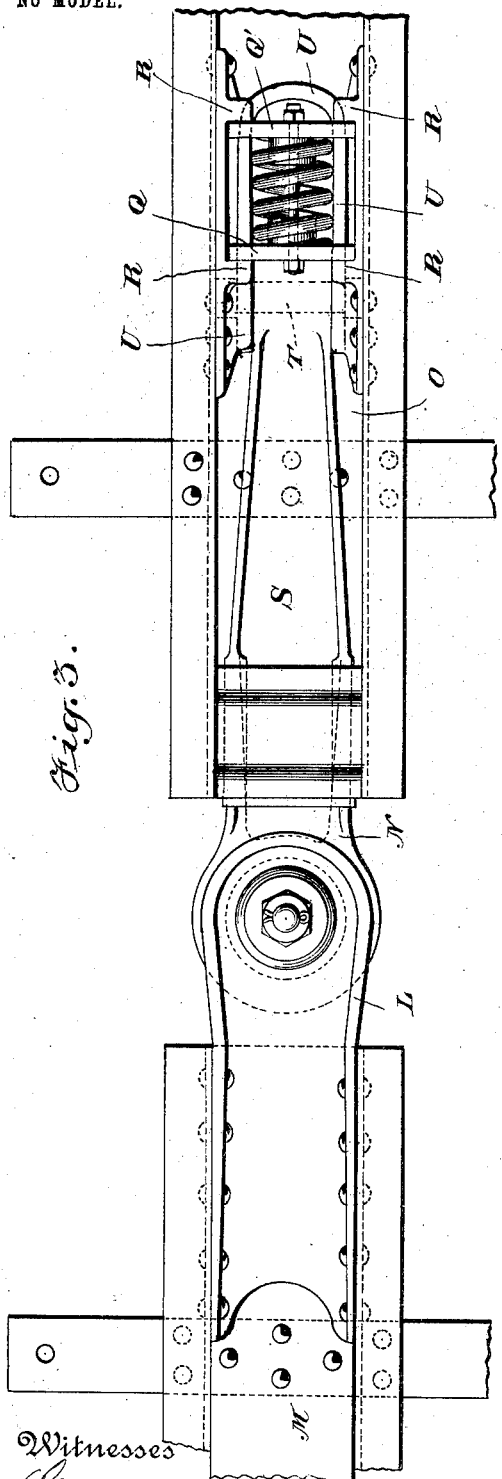
Figure 4:
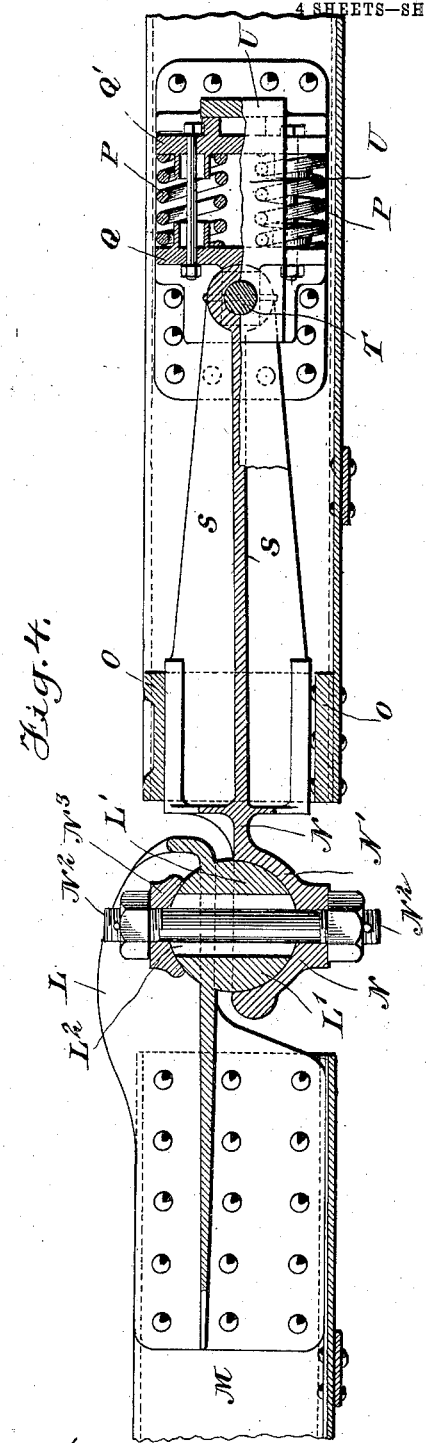

Figure 1 illustrates a view in plan of the first section of the discharge-pipe adjoining the dredge and shows the manner of connecting said pipe to the dredge. Fig. 2 illustrates a view in elevation of the parts shown in Fig. 1. Fig. 3 illustrates a plan view of the ball-and-socket connection and coacting parts whereby the different sections of the discharge-pipe are connected together. Fig. 4 illustrates an elevation, mostly in vertical section, of the parts shown in Fig. 3. Fig. 5 illustrates a plan view of one section of the discharge-pipe with its floats or pontoons. Fig. 6 illustrates a cross-section of the discharge-pipe with its floats or pontoons. Fig. 7 illustrates a detail of the binder or strap whereby the floats, the discharge-pipe, and the truss-frame or cradle by which they are supported are all bound and clamped together. Fig. 8 illustrates an elevation, partly in section, of the adjoining ends of two sections of the discharge-pipe with their rubber connection and the ball-and-socket joint between the sections.

This invention relates to a floating discharge-pipe adapted to carry away from a dredge of the hydraulic or suction pipe the material excavated or dredged by it.

The object of the invention is to provide a discharge-pipe which shall be adapted to work in a seaway and to withstand the strains due to the action of the waves and also to provide simple, durable, and relatively inexpensive and ready means whereby such discharge-pipe may be constructed or assembled and again knocked down, and also connected or disconnected from the dredge or scow.

The discharge-pipe described in this specification is adapted to be used in connection with any dredge of the type in which the dredged material is discharged through a discharge-pipe.

The special form of the dredging apparatus forms no part of this invention.

I will first describe the construction of the floating part of the discharge-pipe and coacting parts and then the means employed whereby such pipe is detachably attached to the dredge or scow.

In the drawings herewith, A represents the discharge-pipe; B B, pontoons or floats preferably cylindrical in form of shorter length than that of the sections of the discharge-pipe. They are closed at their ends in any suitable manner, as by heads.

C is a truss-frame, made of heavy flat iron, having the three curved surfaces shown adapted to receive the three cylindrical parts above stated—*i. e.*, the centrally-disposed discharge-pipe A and the two laterally-disposed floats or pontoons B. This frame is trussed at its lower part by the inclined side pieces C' C' and an underlying chord C². Bolts passed through the ends of all the members involved unite them rigidly, and thus a firm reliable support for the very considerable weight of the discharge-pipe is afforded and a means provided whereby all the parts may be firmly nested together.

D is a metallic strap or other binder which passes through the looped upper ends of the frame C and extends over the top of the discharge-pipe, whereby it is held firmly in place within the trussed cradle or frame C.

E is what may be called a "universal binder," which encircles the entire structure—to wit, the discharge-pipe, the two floats, and the frame C—which being stretched tight will rigidly bind the whole structure together. I prefer that this binder E should be made as shown in Fig. 7, in which a casting F is provided with a threaded eyebolt G and a powerful nut H, so that a doubled cable H', the ends of which are clamped by clips I I, secured by bolts J J, as shown, being passed around the discharge-pipe, floats, &c., and properly engaged with the casting F, while the eyebolt G and the nut H are slack, may be tightened and caused to firmly draw and bind all the parts together by screwing up the nut H. In order that this may be done effectively, I construct the threaded eyebolt G and the nut H of proper size and with proper pitch to the thread, so that the requisite power may be exerted. There may be as many of these binders employed upon each float as desired. I show four in Fig. 5. If the pontoons or floats are small and the discharge-pipe relatively light, two only—one near each end of the float—will be sufficient; but sometimes it will be judicious to employ more than illustrated by me.

Obviously the tightening-bands may be made of rope, round iron, or chain; but I prefer to use the doubled or two-part wire cable fitted with the clamps and tightening arrangements, as shown.

I call particular attention to the fact that because of the above-stated construction the pipes, with their pontoons, can be readily erected and as readily knocked down for transportation or repair and that no bolt-holes or punctures are required either in the pipe or its floats nor are any special tools or parts required. All the elements are complete in themselves, so that it is simply necessary to put them together at the time of use and take them apart at the time of disuse or for transportation, which can be easily and quickly done by the crew of the dredge, and no specially-skilled assistance or any tools other than those always found aboard such dredges are required.

For the purpose of connecting the sections of the discharge-pipe to each other and providing suitable flexibility in a seaway I employ a special form of ball-and-socket joint provided with relief or cushioning springs, as is shown in Figs. 3, 4, and 8. In Figs. 3 and 4, for the sake of greater clearness, I do not illustrate the usual flexible rubber connection between the ends of the sections of the discharge-pipe, but I do illustrate this feature at $w$ in Fig. 8. For the same reason I do not show the ball-and-socket joint in Fig. 5, although in that figure I do show the rubber connection. The rubber connection may be of any of the usual forms and will serve the purpose of providing continuity in the pipe, but is not well adapted to resist the severe strains to which the structure is incident in a seaway, particularly in doing the heavy work for which my invention is more particularly intended. The ball-and-socket connection or joint which I provide to relieve the rubber connection of strains is superimposed over the center of the rubber sleeve in such manner that the entire working strains due to the surging and rolling of the pipes will be resisted by this metallic joint and not by the rubber sleeve. Referring to Figs. 3 and 4, one member of the ball-and-socket joint L is rigidly attached to a frame M on top of one section of the discharge-pipe and the other member N is elastically attached to a similar frame O on the adjacent end of the adjoining section of the pipe. The frame M and the part L of the ball-and-socket joint supported by it are rigidly bolted to the top of the discharge-pipe, as shown, and the frame O is in like manner rigidly bolted to the top of the other section. On the part L is formed a spherical terminal L' and on the part M is formed a spherical socket N'. The spherical part L' has a hole $L^2$, through which passes a bolt or pin $N^2$, provided with nuts and a concave washer, as shown. The hole $L^2$ is so much larger in diameter than the pin that all requisite movement due to wave action is permitted at this point. One or the other of the above-described parts of this structure (the right-hand one, as illustrated in Figs. 3 and 4) is provided with cushioning-springs P P. I prefer to employ two. One only, however, may be employed. These springs abut at each end against movable plates Q and Q', which are prevented from undue separation by lugs R R, forming part of the casting. S is a draw-bar resembling the draw-bar in car-coupling devices, which is duly supported by the frame O and is ribbed, as shown, to give it requisite strength. Its outer end abuts against the plate Q, and near this end it is connected by a cross-pin T to a strap U, which incloses the springs and the plates Q and Q'. The operation is obvious. Should the strains exerted by the wave action be compressing strains, then the end of the draw-bar impinging upon the plate Q compresses the springs, the abutment therefor being the opposite plate Q', which is supported by the rearmost lugs R. If, on the other hand, the strains be tensile in character, then the pull of the draw-bar will be transmitted through the pin T and yoke or strap U to the plate Q', and the springs will be compressed, but in the opposite direction, the plate Q and the rearmost lugs E now serving as resistance therefor. All rolling as well as pitching motion of the parts relative to each other is compensated for in any and all directions by the ball-and-socket joints L' N'. It will be noted that all the strains which can arise at these joints between the pipe-sections will be taken upon the metallic devices described and that the inserted rubber section is relieved therefrom and has no function to perform excepting that of affording continuity to the pipe.

The section of the discharge-pipe which is adjacent to the dredge is constructed somewhat differently from the other sections. It is shown in Figs. 1 and 2. This section is preferably of shorter length than the ordinary floating sections, being only sufficiently long to permit of the requisite rise and fall due to wave action without making too great an angle at the point of attachment to the dredge. This section of the pipe is connected to a swivel-elbow on the dredge, which forms the subject-matter of a separate application for Letters Patent filed by me. I will not, therefore, herein specifically describe it, but will indicate it generally by the letter X. It is supported at one corner of the dredge $a$ by projecting framework $b\ b$ and an A-frame $c\ c$. The last section of the pipe is connected to this swivel-elbow by two hinged lugs $d\ d$, which are properly pivoted within similar lugs $e\ e$ on the lower swiveling member of the swivel-elbow. The lugs $d\ d$ are rigidly bolted, as shown, to a short section of the discharge-pipe $f$, so that vertical pivotal action is afforded by the joint just described. $g$ is a section of rubber pipe which permits the vertical action referred to. $h$ is a casting rigidly bolted to the end of the pipe $f$, and $i$ is another casting rigidly bolted to the end of the last section of the discharge-pipe A. $k$ is a bell-crank lever which is connected with a pin $l$, which passes down through the terminal parts of the castings $h$ and $i$, whereby they are pivoted together and afforded universal movement. $m$ is a strong cotter-pin which passes through the lower end of the pivot-pin $l$ and is held against displacement by a spring or equivalent device, which, however, may be overcome by a sufficiently strong pull upon a rope or chain $n$, which extends from the end of the cotter-pin inboard. $o$ is a rod, rope, or chain which extends from the upper member of the bell-crank lever inboard also. The member $i$ of this joint may beneficially be provided with springs $p$, resembling the springs P of the joint between the pipe-sections proper, so that this joint likewise may be cushioned against compressing and tensile strains, and to supplement this relief I provide lateral guys $q\ q$, which are provided with spring-links $r\ r$, the construction of which is well understood and does not require specific description. The inboard ends of these guys are connected to suitable brackets $s\ s$ by hooks $t\ t$, which catch over a pin forming part of the brackets referred to. These guys are sustained by outwardly-extending and suitably-supported extensions thereof $u\ u$. The guys $q\ q$ are not normally called into action; but when by unusual wave action or for other reason the movement of the pipe relative to the dredge, or vice versa, becomes excessive then they are called into action and the pipe is relieved of rupturing strains. $v$ is a tackle, whereby the parts being disconnected, as hereinafter described, the part $f$ of the pipe may be elevated. I employ the bell-crank lever $k$ with the detachable pin $l$ and detachable cotter $m$ and provide hooks on the ends of the guys $q$, which are thereby detachably attached to the brackets $s$, so that in the event of a heavy storm or any other likelihood of marine disaster the dredge may be separated from the pipe by unhooking the hooks $t$, drawing out the cotter-pin $m$ by hauling on the chain or rope $n$, and lifting the pivot-pin $l$, so as to disconnect the parts by hauling on the rope or chain $o$, whereupon the guys $q\ q$ will drop into the water, the strain on the parts will sever or pull apart the rubber section $w$, and thereupon the dredge and the pipe will be entirely disconnected from each other, and the dredge can look out for its own safety, freed from the pipe, and the pipe being freed from connection with the dredge will adjust itself to the storm in such manner as to be least liable to injury, or other means may be then provided for the preservation of the pipe.

It will be obvious to those who are familiar with this art that many modifications may be made in the details of construction described and claimed by me without departing from the essentials of the improvements recited. I therefore do not limit myself to such details. I have described and illustrated the construction above shown simply as one form, and a desirable form, in which my invention may be embodied, but not by any means as the only form.

I claim—

1. A section of floating discharge-pipe composed of a length of pipe and two floats therefor, all rigidly connected and bound together so as to be immovable relative to each other.

2. A section of floating discharge-pipe composed of a centrally-disposed pipe and two floats, one on either side thereof and a series of frames in the length of the section which hold the pipe and floats in proper position and immovable relative to each other.

3. A section of floating discharge-pipe composed of a centrally-disposed pipe, two floats by the side thereof, a frame to hold them in relative position and bands encircling the pipe and the floats whereby they are bound together.

4. A section of floating discharge-pipe composed of a centrally-disposed pipe, two floats by the side thereof, a frame to hold them in relative position and bands encircling the pipe and the floats whereby they are bound together, said bands being provided with adjustable tightening devices.

5. In a floating discharge-pipe a frame for sustaining the pipe and floats therefor embodying members adapted to fit the exterior surface of the pipe and floats and means to bind the parts together.

6. In a floating discharge-pipe a truss-frame for sustaining the pipe and floats therefor embodying members adapted to fit the exterior surface of the pipe and floats, a chord or truss for stiffening the said frame and means to bind all the parts together.

7. In a floating discharge-pipe a frame for sustaining a centrally-located pipe and two floats therefor, said frame having members formed on arcs of circles adapted to fit the exterior of the discharge-pipe and of the two floats, but not to entirely encircle them, and a chord or truss for said frame.

8. In a floating discharge-pipe a frame for sustaining a centrally-located pipe and two floats therefor, said frame embodying members formed on arcs of circles adapted to fit the exterior of the discharge-pipe and of the two floats, but not to entirely encircle them, a chord or truss for said frame and means to bind all the parts immovably together.

9. In a floating discharge-pipe a frame for the support of the pipe and floats thereof having a centrally-located portion on which the discharge-pipe rests and laterally-located portions for the support of the floats and having also a truss-frame on its under part, the apex of which is directly beneath the discharge-pipe and the ends of which are connected by a horizontal tension member or chord.

10. In a floating discharge-pipe a frame for the purpose described formed of an upper member shaped to receive and properly support the discharge-pipe and two floats therefor, said member having at its upper part means for attaching a strap thereto, an intermediate member having a truss, and a lower member or chord to resist tensile strain and a strap adapted to embrace the discharge-pipe.

11. In a floating discharge-pipe a flexible band for binding the pipe and its floats together formed of two parts of a single rope or cable and a tightener therefor embodying a casting, an eyebolt and a nut for the eyebolt.

12. A ball-and-socket joint for connecting the sections of discharge-pipe, the members whereof respectively are attached to adjacent ends of the discharge-pipe, the center of the junction being midway between said pipes.

13. A ball-and-socket joint for connecting the sections of discharge-pipe, the members whereof respectively are attached to adjacent ends of the discharge-pipe, the center of the junction being midway between said pipes, and a section of flexible material engaging the opposite ends of the pipe whereby it is made continuous.

14. A ball-and-socket joint for the purpose described having a bolt passing through the center of the ball and the socket rigidly connected to the socket but movably connected to the ball.

15. A ball-and-socket joint for the purpose described having a bolt passing through the center of the ball and the socket rigidly connected to the socket, but movably connected to the ball, said ball having a washer concave on one side to fit the exterior of the ball.

16. A ball-and-socket joint embodying two members, a ball member and a socket member, one of them provided with cushioning-springs adapted to resist compressing as well as tensile strains.

17. The combination of a ball-and-socket joint for connecting the sections of a floating discharge-pipe embodying two members, a ball member and a socket member, one of said members having a sliding shank, a fixed frame and two springs with plates between the plates whereby thrusting as well as pulling strains may be cushioned by the springs.

18. A section of a floating discharge-pipe connecting the same to the dredge, having a ball-and-socket joint at one end and a doubled vertical hinged joint at the other end.

19. A section of floating discharge-pipe connecting the same to the dredge, having a ball-and-socket joint at one end and a doubled vertical hinged joint at the other end in combination with a swivel-elbow attached to the dredge.

20. In a floating discharge-pipe a section thereof pivotally and permanently connected to the dredge, the remainder of the discharge-pipe being detachably connected to the said permanently-connected section.

21. In a floating discharge-pipe a section thereof pivotally and permanently connected to the dredge, the remainder of the discharge-pipe being pivotally attached to the first-named section by devices detachable from the dredge.

22. In a discharge-pipe a section thereof permanently connected to the dredge, the remainder thereof being pivotally connected to said permanently-connected part and guys therefor provided with spring-links which are brought into action during excessive movement of the pipe relative to the dredge.

23. In a discharge-pipe a section thereof permanently connected to the dredge, the remainder thereof being pivotally connected to said permanently-connected part, guys therefor provided with spring-links which are brought into action during excessive movement of the pipe relative to the dredge, and means whereby the guys and the pipe may be detachably attached to the section which is permanently connected to the dredge.

In testimony whereof I have signed my name to this specification in the presence of two subscribing witnesses.

ARTHUR W. ROBINSON.

Witnesses:
E. M. CORBET,
A. J. YOUNG.